April 4, 1967 S. C. HAUG 3,312,291

DERRICKS

Filed Oct. 5, 1964 11 Sheets-Sheet 1

April 4, 1967 S. C. HAUG 3,312,291

DERRICKS

Filed Oct. 5, 1964 11 Sheets-Sheet 2

DERRICKS

Filed Oct. 5, 1964 11 Sheets-Sheet 3

April 4, 1967 S. C. HAUG 3,312,291

DERRICKS

Filed Oct. 5, 1964 11 Sheets-Sheet 5

April 4, 1967 S. C. HAUG 3,312,291

DERRICKS

Filed Oct. 5, 1964 11 Sheets-Sheet 8

United States Patent Office 3,312,291
Patented Apr. 4, 1967

3,312,291
DERRICKS

Stanley C. Haug, Brooklyn, N.Y., assignor to Raymond International, Inc., New York, N.Y., a corporation of New Jersey Filed Oct. 5, 1964, Ser. No. 401,365
20 Claims. (Cl. 173—28)

This invention relates to derricks and more particularly to new and useful improvements in the construction and operation thereof. The concepts according to this invention are useful for various hoisting apparatus, particularly such apparatus employing a tackle rigged at the end of a beam, leader or boom. Such hoisting apparatus constructed in accordance with this invention may be used over a deep-well hole such as an oil well for supporting the tackle for boring or hoisting or lowering.

Apparatus according to the present invention may also be used advantageously with a pile driver and for purposes of explanation a pile driver constructed in accordance with the concept of this invention will be illustrated.

Although a variety of derricks are presently available and have been described in the literature, they have not been entirely satisfactory for many purposes. It is an aim of the present invention to provide new and improved derricks which incorporate structure of reduced dimensions and weight, which is compact and which may be readily transported from one job site to another. This is particularly important due to the large number and variation of highway restrictions and regulations. A feature of this invention resides in the provision of structure which is adapted to be folded for transportation purposes. A derrick constructed in accordance with this invention is easily converted from its operating condition to its transporting condition and thereby reduces time losses as well as decreasing the time involved between individual jobs. It is an aim of this invention to provide a new and improved derrick which is severable into components for transporting purposes. Further, the unit may be provided with self-hoisting elements for purposes of simplifying the loading thereof upon a transporting vehicle. The derrick is provided with a boom which may be easily folded. Also the pile driver is provided with a horizontal base which is extensible for operating purposes and retractable for transporting purposes.

In apparatus according to this invention the leader may be positioned at any radius within the range of the machine by merely changing the extension of the spotting cylinder while retaining the batter cylinders unchanged. Thus, one of the features of this invention is the provision of a derrick having improved leader positioning means.

A feature of this invention resides in the provision of a derrick having improved structural support for a pivotable leader.

In addition, a feature of this invention resides in the provision of a novel bottom pile guide which accurately positions the pile, and which may be moved between a plurality of positions regardless of the disposition of the pile.

Still another aim of this invention resides in the provision of a derrick which is reliable, compact and efficient.

According to one form of the invention there is provided a derrick having a boom or leader member with means for guiding and supporting the leader which comprises a turn table, a back frame, a top frame and a front frame. The back frame is pivotally connected to the top frame along a first pivot line, the top frame is pivotally connected to the front frame along a second pivot line, the front frame is pivotally connected to the turntable along a third pivot line and the back frame is pivotally connected to the table along a fourth pivot line. A spotting cylinder interconnects the first pivot line with the third pivot line and a medial portion of the leader is pivotally connected along the second pivot line. A pair of batter cylinders are provided having the lower ends thereof pivotally connected along the first pivot line in spaced apart relation one to the other and having the other ends thereof pivotally connected to the boom or leader member. It should be appreciated that the frames are so disposed as to collectively form substantially a parallelogram linkage with the table for supporting the boom member.

The leader supports a head frame at the top thereof and a hammer unit is adapted to be raised or lowered parallel to the front surface of the leader. Towards the bottom of the leader is provided a bottom pile guide assembly which comprises a shaft and means mounting the shaft on the leader for pivotal movement. A guide member is carried by the shaft and adapted to engage the pile, and a sleeve member is also mounted on the shaft for reciprocating motion with respect thereto. A pair of arms are pivotally mounted on the sleeve and a pair of jaws are pivotally carried by the arms, respectively. A fluid actuating cylinder is pivotally attached to the sleeve for moving the sleeve from a first extended position in which the jaws engage the pile to a second position wherein the jaws have released the pile but are adjacent thereto. By moving the fluid actuated cylinder a still greater distance the pile guide is moved to a third position in which the shaft is pivoted to a substantially vertical plane away from the pile and the jaws and guide member are completely removed from the pile.

According to still another form of the invention the derrick is adapted to be positioned upon a transporting vehicle by a novel method. Such method includes the steps of removing the hammer and swinging the turntable perpendicularly to the crawlers, retracting the spotting cylinder until the leader is at its maximum radius and thence removing all but one bolt from the hinge joint and retracting the batter cylinders until the leader is horizontal. The next steps comprise removing the last bolt and horizontally pivoting the upper leader section until the upper and lower sections are in face to face relationship one to the other; next, releasing the power unit platform and extending the raising cylinders until the crawlers leave the ground and thence retracting the crawlers, then, again extending the raising cylinders until the crawlers clear the truck deck, and then running the truck under the crawlers and retracting the raising cylinders until the crawlers rest on the truck deck. This method further comprises again retracting the raising cylinders and swinging the upper works parallel to the tracks; then, extending the power unit cylinder to move the power unit back, extending the spotting cylinder to lower the leader, and removing the head frame bolts to rotate the head frame under the leader. Subsequent steps comprise again extending the spotting cylinder until the leader is down and finally blocking up and tying down the unit on the truck which is then ready to be driven to the next installation site.

The invention in another form thereof comprises a method of shipping the derrick in two separate units and includes the following steps: removing the hammer and swinging the turntable perpendicular to the crawlers; retracting the spotting cylinder until the leader is at its maximum radius; removing all except one bolt from the hinge joint; and retracting the batter cylinders until the leaders are horizontal, removing the last bolt and pivoting the upper leader section; then, extending the spotting cylinder to lower the leaders and removing the head frame bolts and rotating the head frame under the leaders; subsequently, extending the raising cylinders until the crawlers clear the ground and then retracting the crawlers, again extending the raising cylinders until the crawlers clear the truck deck, running the truck under the crawlers and retracting the raising cylinders until the crawlers rest on the truck and thence tying down. The subsequent steps comprise retracting the hook rollers and disconnecting the hoses, extending the raising cylinders until the kingpin clears the turntable and thence driving off with the lower unit. The next steps comprise running the truck under the upper portion of the pile driver, retracting the raising cylinders until the pivot pad rests on the box, again retracting the raising cylinders and then rotating the turntable 90 degrees; next, extending the power unit cylinder in order to move the power unit back, then releasing the power unit platform, extending the spotting cylinder until the leader is down, and then blocking up and tying down the upper unit on the truck which is then ready to be driven to the next installation site.

Further objects, features and advantages of the invention hereof will appear from the detailed description given below, taken in connection with the accompanying drawings which form a part of this specification and illustrate by way of example, preferred embodiments of the invention.

In the drawings:

FIG. 23 is a plan view of the pile driver of FIG. 22;

Figure 1:
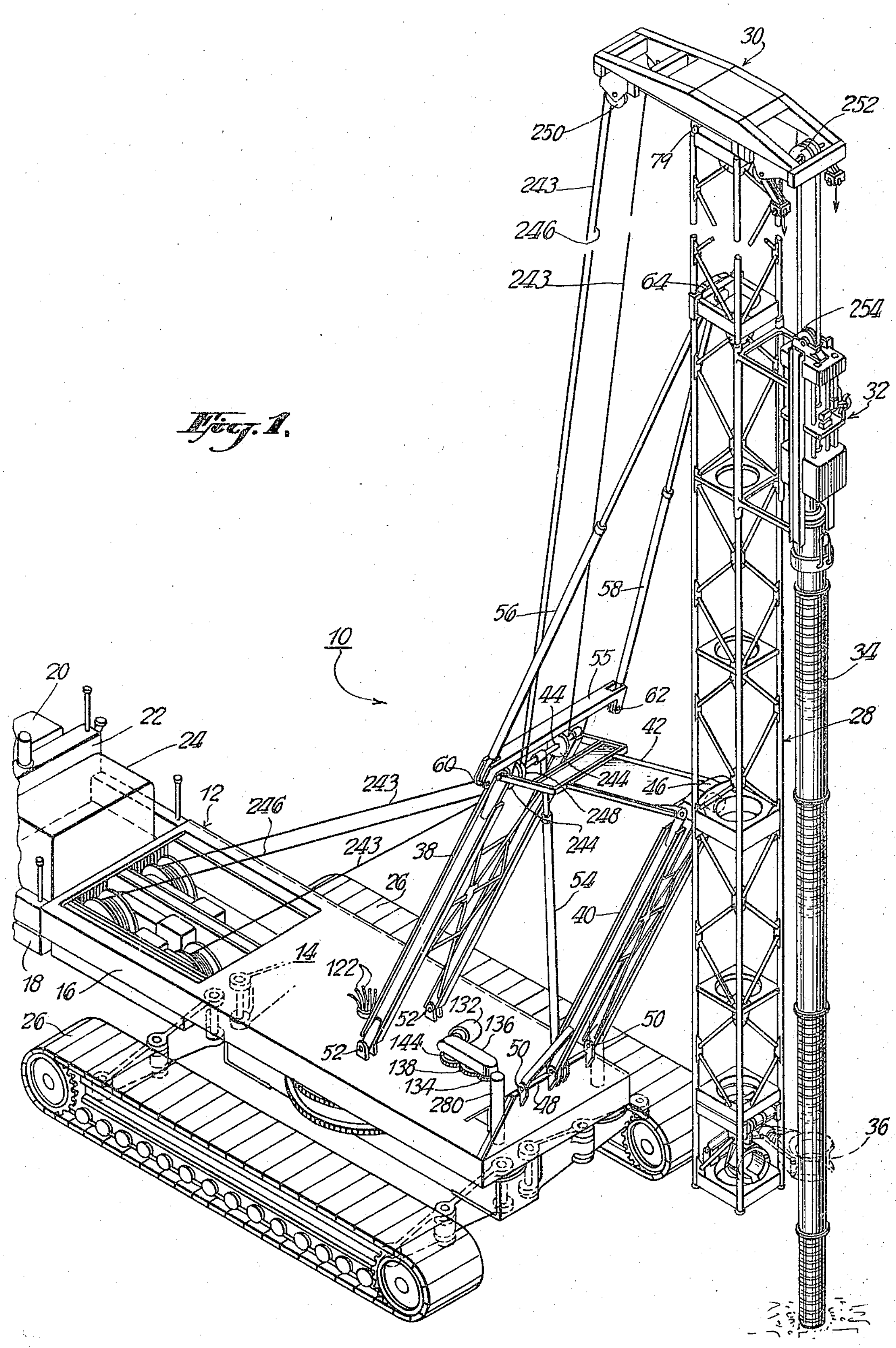
FIG. 1 is a fragmentary perspective view showing a pile driver constructed in accordance with the concepts of this invention.

In the illustrated embodiment of the invention and with particular reference to FIG. 1 it is seen that the pile driver 10 comprises a horizontal base designated generally at 12 including a turntable 14, an integral drum platform 16, a power unit platform 18 and a fuel tank 22. The power unit platform 18 carries an engine 20 and a power pack 24. The horizontal base 12 is carried by a pair of crawlers 26 and in turn supports a boom or leader designated generally at 28, the leader being of the box type. The leader 28 supports a head frame 30 which in turn carries a hammer unit 32 adapted for driving a pile 34. In addition, the leader 28 carries a bottom pile guide 36 for purposes of aligning and positioning the pile 34.

Figure 2:
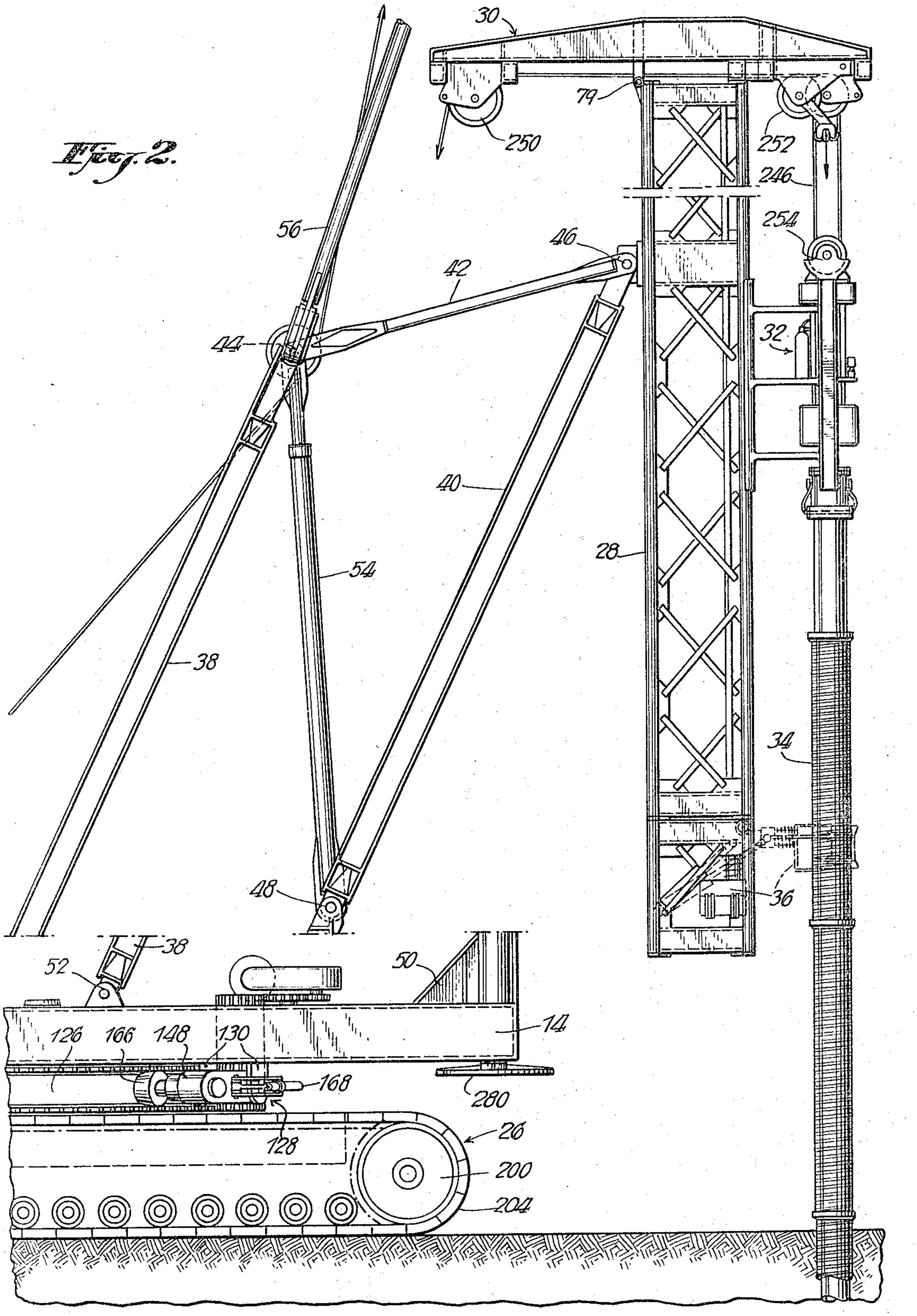
FIG. 2 is a side elevation of the front portion of the pile driver of FIG. 1, a medial portion of the leader being removed.

As best seen in FIG. 2, the leader 28 is positioned and supported by a back frame 38, a front frame 40 and a top frame 42. Referring to FIGS. 1 and 2, the back frame 38 is pivotally connected to the top frame 42 along a first pivot line as by means of a cross pin 44. The top frame 42 is pivotally connected to the front frame 40 along a second pivot line as by means of cross member 46. The leader 28 is also pivotally connected to the top frame 42 and the front frame 40 by the same cross member 46. The front frame 40 is pivotally connected to the turntable 14 along a third pivot line as by means of cross pin 48 which is supported on the turntable 14 by means of tie plates 50. The back frame 38 is pivotally connected to the turntable along a fourth pivot line as by means of tie plates 52. Still referring to FIGS. 1 and 2, a hydraulic spotting cylinder 54 is anchored at one end to the cross pin 48 on the turntable 14 and anchored at the other end to cross pin 44 between the back frame 38 and the top frame 42. Thus, the frames 38, 40 and 42 collectively form substantially a parallel motion mechanism or parallelogram linkage with the table 14 for supporting the leader 28. By extending or contracting the hydraulic cylinder 54, the leader 28 may be positioned at any radius within the range of the machine.

Figures 3, 4, 5, 6:
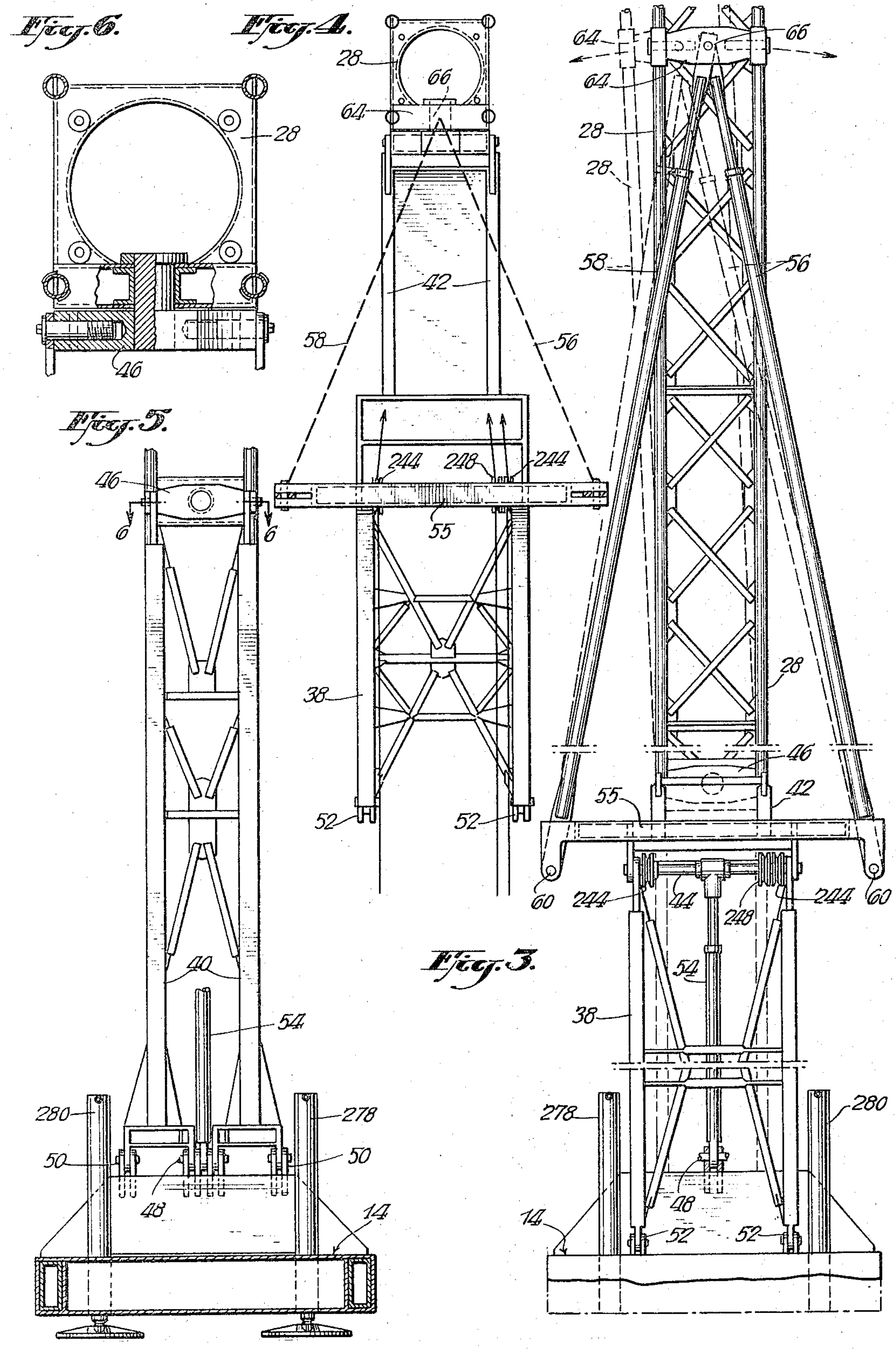
FIG. 3 is a perspective view showing the back end of the leader as well as the positioning and supporting means therefor.
FIG. 4 is a plan view of the leader and top frame with the head frame removed for purposes of illustration.
FIG. 5 is a perspective view showing the front end of the front frame including its upper and lower pivotal connections.
FIG. 6 is an enlarged sectional view taken substantially along the line indicated at 6—6 of FIG. 5.

A cross member 55 (FIG. 1)is pivotally attached to the cross pin 44. A pair of hydraulic batter cylinders 56 and 58 are pivotally anchored at one end to the cross member 55 as at 60 and 62 respectively, and are pivotally anchored at the other end to cross member 64 by pin 66 (FIG. 3), cross member 64 being carried by the leader 28. Referring to FIGS. 1 and 3, it is clearly seen that the lower portions of the batter cylinders 56 and 58 are spaced one from the other, while the upper portions thereof are pivotally connected one to the other. The batter cylinders serve to align the leader 28 as best seen in FIG. 3 wherein the solid lines show the batter cylinders 56 and 58 and leader 28 in a first position and the broken lines show these elements in a second position, transition being accomplished by extending cylinder 56 or retracting cylinder 58.

In operation adjustment of the batter cylinders 56 and 58 controls the plum of the leader 28. By means of adjusting the spotting cylinder 54, the leader 28 may be positioned at any radius within the range of the machine without the necessity of altering the batter cylinders. This is a marked advance over apparatus of the prior art which apparatus destroyed the plum of the leader when spotting out and swinging it down.

Figure 7:
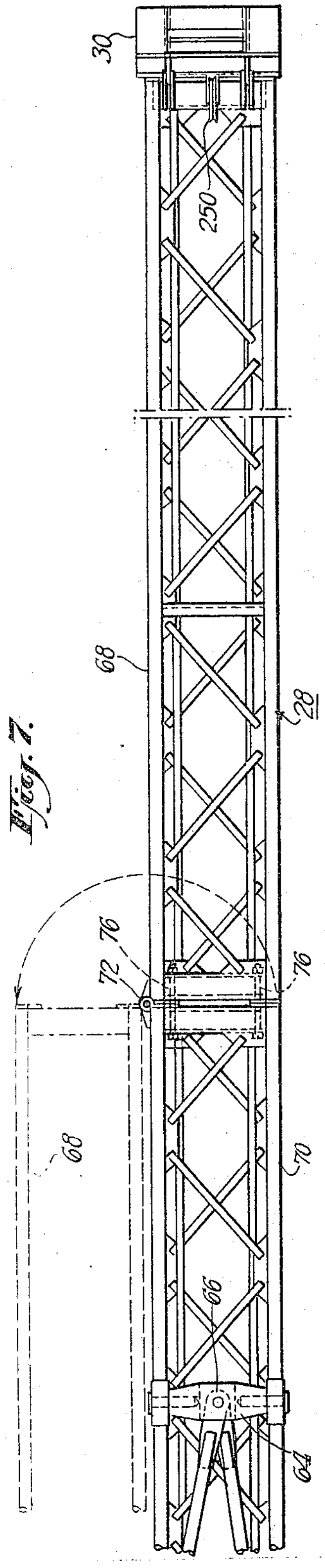
FIG. 7 is a side elevation of the leader showing the foldable connection between the upper leader portion and the lower leader portion.
Figure 8:
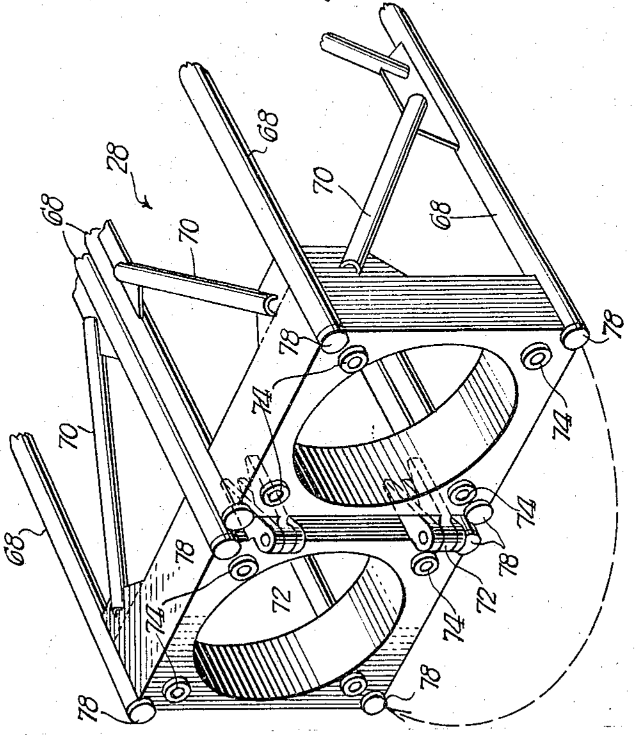
FIG. 8 is an enlarged perspective view showing details of the foldable connection between the upper and lower leader portions.

For purposes of transporting the pile driver from one location to another, the leader 28 includes an upper portion 68 and a lower portion 70 which are hingedly connected one to the other as by means of hinge 72 (FIGS. 7 and 8). As best seen in FIG. 8, tubes 74 are provided for receiving bolts 76 (FIG. 7) which hold the leader 28 in its extended unfolded condition. Buttons 78 are employed to axially align the leader 28 when in its extended condition.

Figure 9:
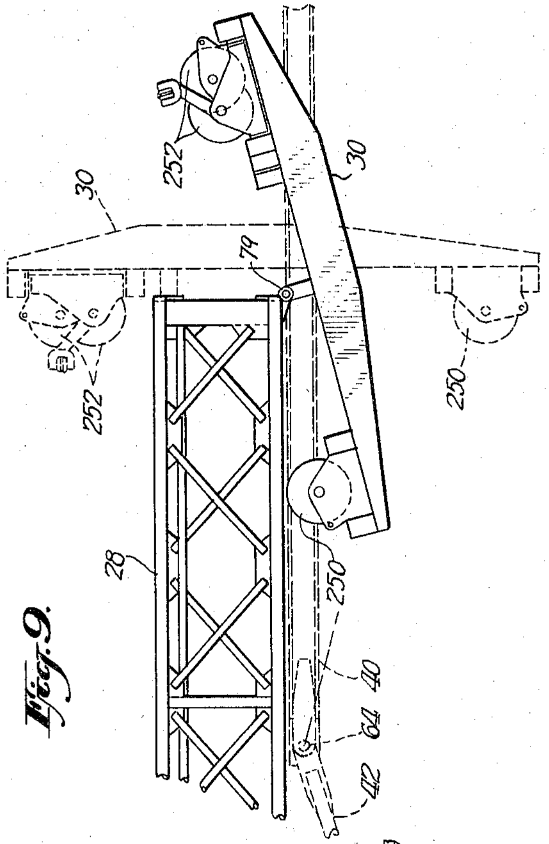
FIG. 9 is an enlarged detail view showing the head frame and its pivotal connection to the top of the leader.

As seen in FIGS. 1, 3 and 9, the leader 28 supports a head frame 30 which is hingedly attached as at 79. During normal operation of the pile driver the head frame is positioned as indicated by the broken line in FIG. 9 and for purposes of compacting the pile driver during transit the head frame is rotated as indicated by the solid lines in FIG. 9.

Figures 10, 11, 12:
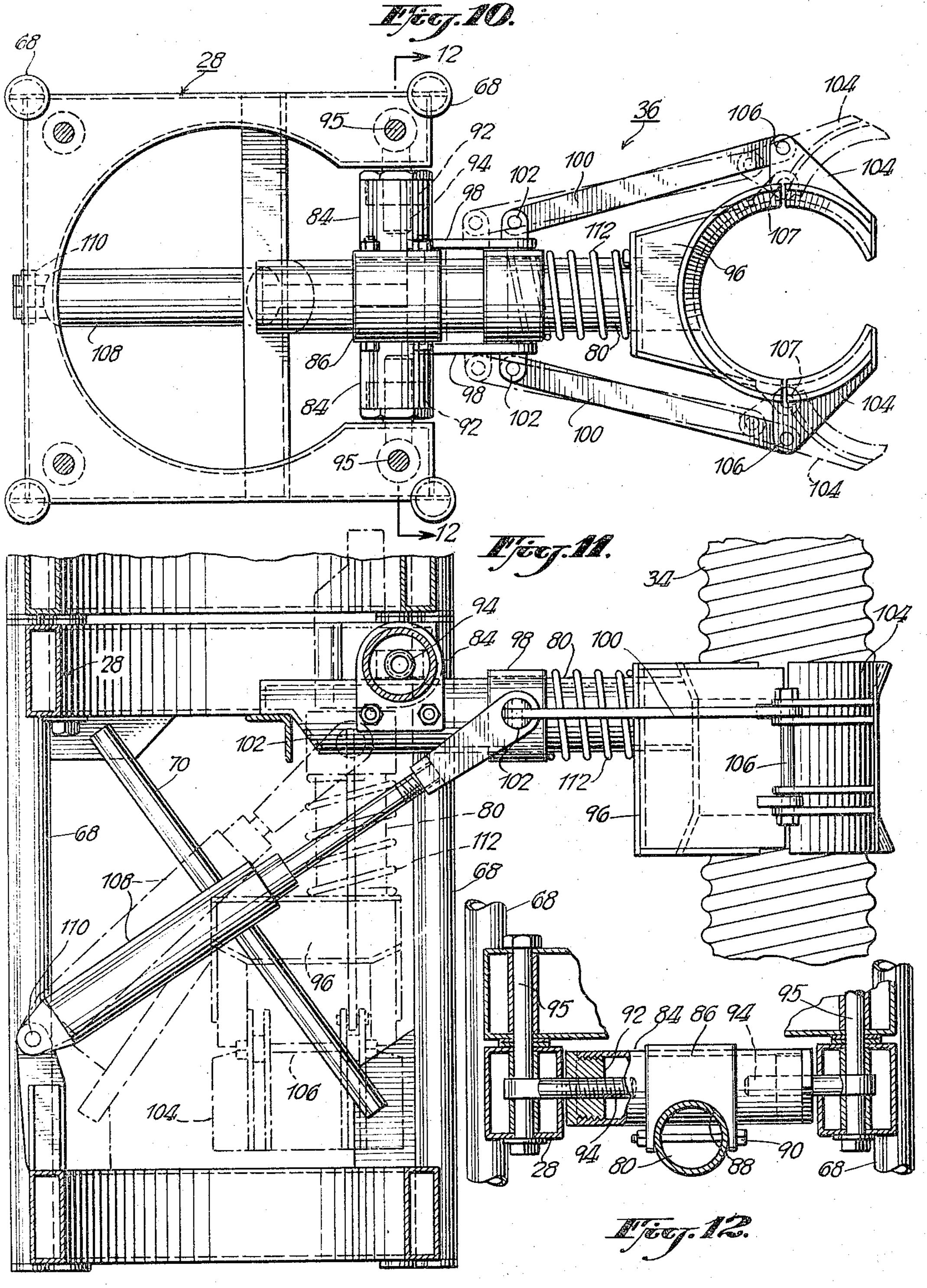
FIG. 10 is an enlarged plan view of the bottom pile guide and showing its mounting means on the lower portion of the leader.
FIG. 11 is a side elevation of the bottom pile guide of FIG. 10.
FIG. 12 is a sectional view taken along the line 12—12 of FIG. 10.

As best seen in FIGS. 10 and 11, the bottom pile guide 36 comprises a support member or shaft 80 pivotally mounted on the leader 28 by means of a cross tube 84 which carries a medially disposed yoke 86. The shaft 80 passes through a recess 88 in the yoke 86 and is secured thereto by means of a pin 90. Bushings 92 (FIG. 12) are threadedly connected to the ends of the cross tube 84, the inside surface of which bushings provide a bearing surface for a cross rod 94 extending concentrically through the cross tube 84. The ends of the cross rod 94 are secured to the leader 28 by means of pins 95 (FIG. 10). A guide member 96 (FIGS. 10 and 11) is carried by the shaft 80 and is adapted to engage the pile 34. A reciprocatable member or sleeve 98 is slidably mounted on the shaft 80 and is adapted for reciprocating motion with respect thereto. A pair of arms 100 are pivotally connected to the sleeve 98 as at 102. A pair of jaws 104 are pivotally connected to the pair of arms 100 respectively by means of pins 106, and they are also pivotally connected to the guide member 96 as by means of pins 107, the jaws 104 being adapted to removably engage the pile 34. As best seen in FIG. 11, a fluid actuating cylinder 108 is pivotally attached to the sleeve 98 at one end as at 102 and is pivotally connected to the leader 28 at the other end as at 110. A compression spring member 112 is provided having one end engaging the fixed guide member 96 and the other end thereof engaging the sleeve 98 with a force which tends to move the sleeve 98 away from the pile, partially counteracting the force of the hydraulic cylinder 108. Selective actuation of the fluid or hydraulic cylinder 108 moves the bottom pile guide between three basic positions. Accordingly, as seen in FIGS. 10 and 11, the solid lines indicate the arms 100 and the jaws 104 in their first or closed position for engaging the pile 34, hydraulic cylinder 108 being at its fully extended position. When the hydraulic cylinder 108 is retracted slightly the jaws 104 and the arms 100 move to their second or open position as illustrated by the dotted lines in FIG. 10 wherein the jaws have released their grip on the piling 34. If the fluid cylinder 108 is retracted beyond its second position to a third position, the sleeve 102 moves to the left as viewed in FIG. 11 to the limit of its travel, such travel being limited by the movement of the arms 100 when the jaws are in their fully opened position, and thence the shaft 80 pivots about the cross rod 94 until the assembly reaches the position as illustrated by the dotted lines in FIG 11. Conversely, the bottom pile guide 36 may be moved from its third position to its second position to its first position by extending the hydraulic cylinder 108. Thus, it is seen that the fluid cylinder 108 controls the opening and closing of the jaws 104 as well as the pivotal motion of the shaft 80 to move the entire apparatus completely away from the pile 34. One of the advantages of the present bottom pile guide 36 resides in its ability to be brought up from its third position to its first position even when a pile is disposed adjacent the leader.

Figure 13:
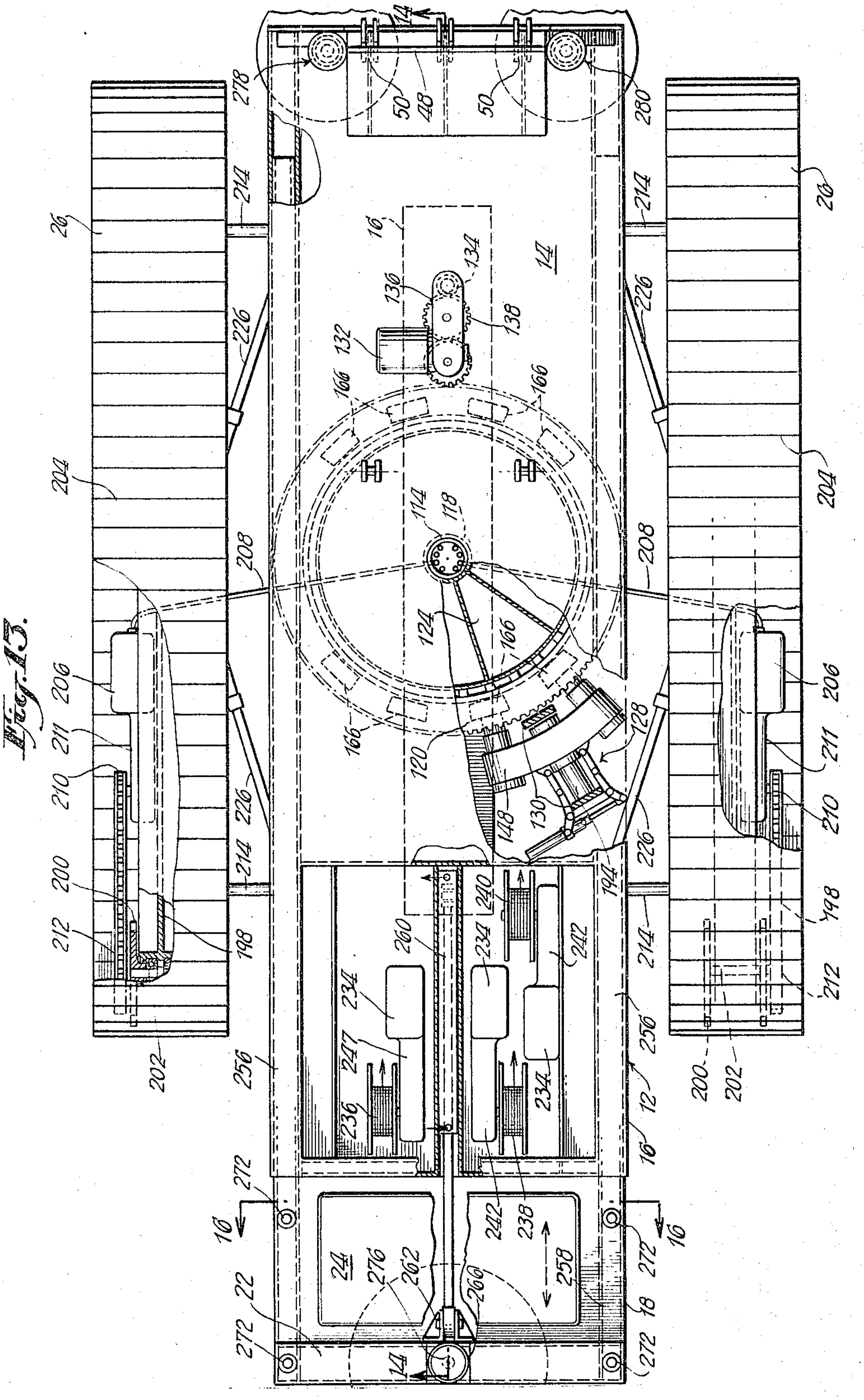
FIG. 13 is a fragmentary plan view of the pile driver with certain portions broken away and other portions removed to illustrate the disposition and operation of the basal portion of the unit.
Figures 14, 15, 16:
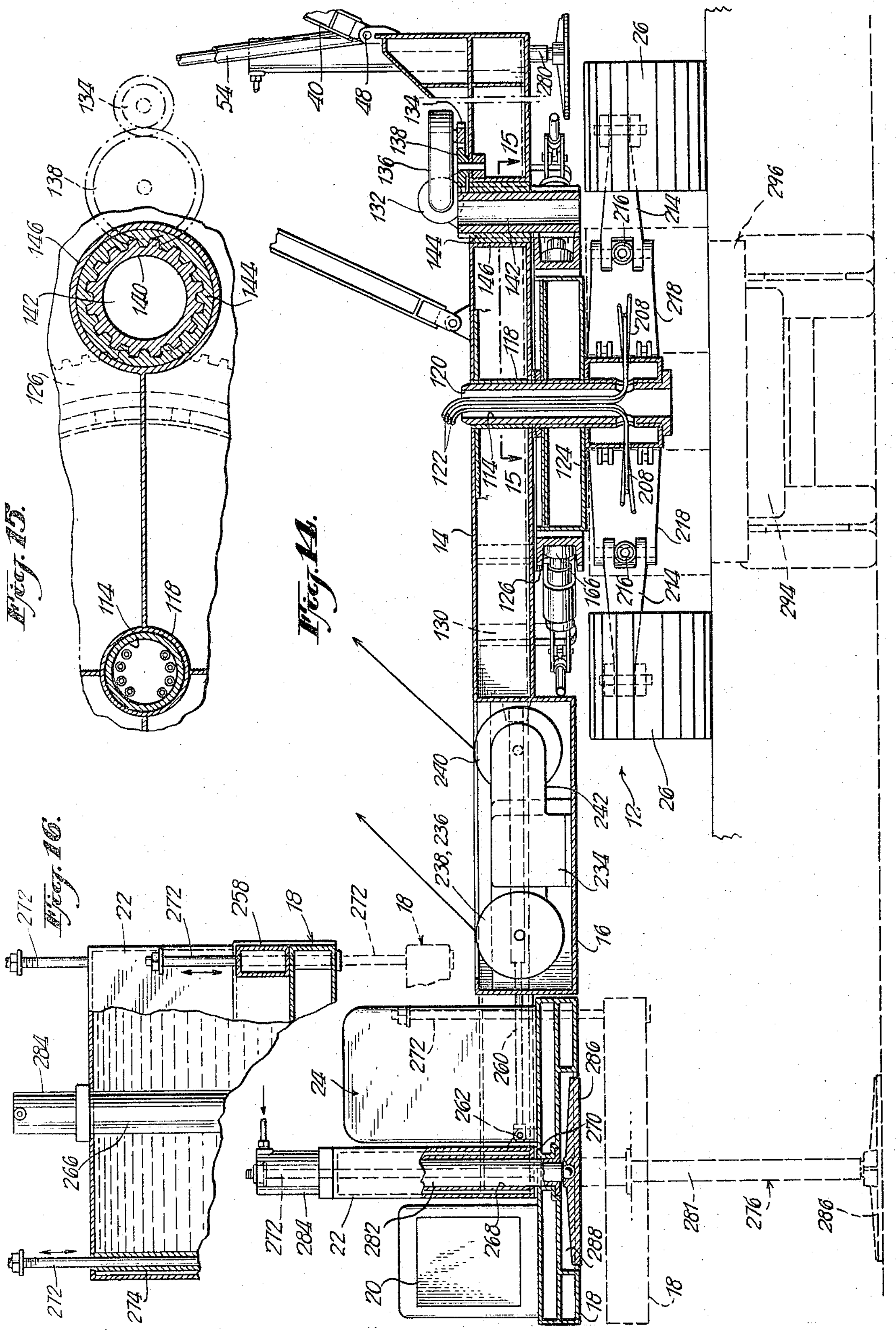
FIG. 14 is a vertical longitudinal, medial, sectional view of the pile driver with certain portions removed to illustrate the disposition and operation of the basal portion of the unit.
FIG. 15 is a sectional view taken substantially along the line 15—15 of FIG. 14.
FIG. 16 is a fragmentary sectional view taken along the line 16—16 of FIG. 13 and showing details of the fuel tank.

As best seen in FIGS. 13 and 14, a turntable 14 is adapted to move about the king pin 114 which is fixedly conected to the bedsill 116 for purposes of radially positioning the leader. A bushing 118 is fixedly connected to the turntable 114, and hence the inside surface of the bushing acts as a bearing surface for the outside surface of the king pin 114. It is noted that the king pin 114 is provided with an axial bore 120 so that power cables designated generally at 122 may pass therethrough from the power pack 24 to the various operating motors disposed adjacent the bedsill 116 as will be more fully discussed hereinafter. As best seen in FIG. 14, the bedsill 116 is provided with center portion or hub 124 which carries the roller track and gear 126. Still referring to FIG. 14, hook roller assemblies 128 are provided with depending tie plates 130 which are fixedly connected to the turntable 14. The hook roller assemblies are adapted to engage the roller track and gear 126 during normal operation of the pile driver. However, for shipping purposes when the machine is to be divided into two separate units as will be discussed more fully hereinafter, the roller assemblies 128 are adapted to be removed from or disengage the roller track and gear 126. The turntable 14 is rotatably driven by means of a motor 132 through a gear train. Selective actuation of the motor 132 controls the turntable rotation. The motor 132 drives gear 134 through a gear reducer 136. Gear 134 drives idler gear 138 which in turn drives gear 140 (FIG. 15), gear 140 being mounted on drive shaft 142 and being adapted to engage the roller track and gear 126. Since the hook roller assembly 128 is in engagement with the roller track and gear 126 the turntable is thereby rotated. In order to protect the upper portion of the gear 140 a sleeve 144, having an internal set of teeth which match the external teeth of the gear 140, is adapted to rotate with the gear. A stationary bushing 146 is carried by the turntable 14 so that the inside surface of the bushing 146 and the outside surface of the sleeve 144 are the bearing surfaces (FIG. 15).

Figure 18:
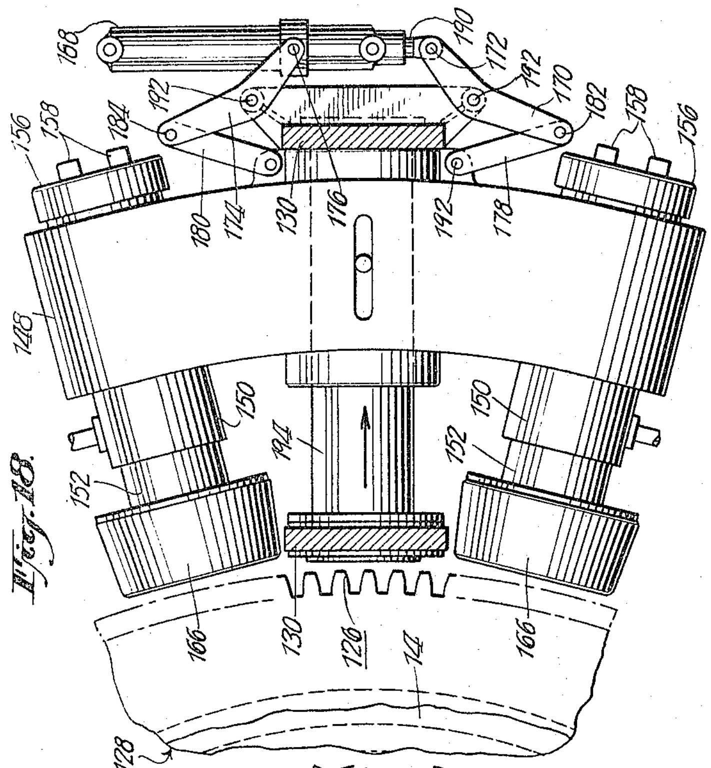
FIG. 18 is an enlarged plan view of the hook roller assembly of FIG. 17, but in its retracted position.
Figure 20:
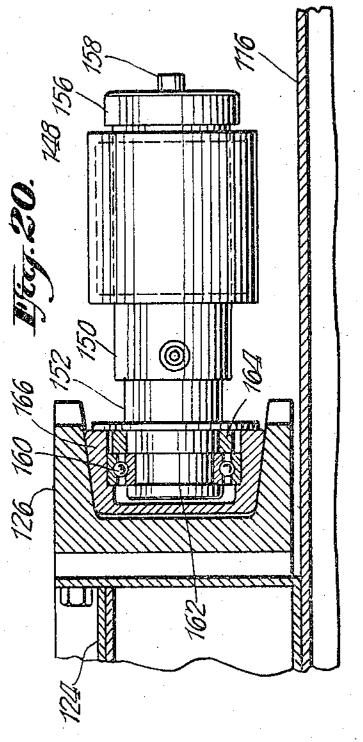
FIG. 20 is a sectional view taken along the line 20—20 of FIG. 17.
Figure 17:
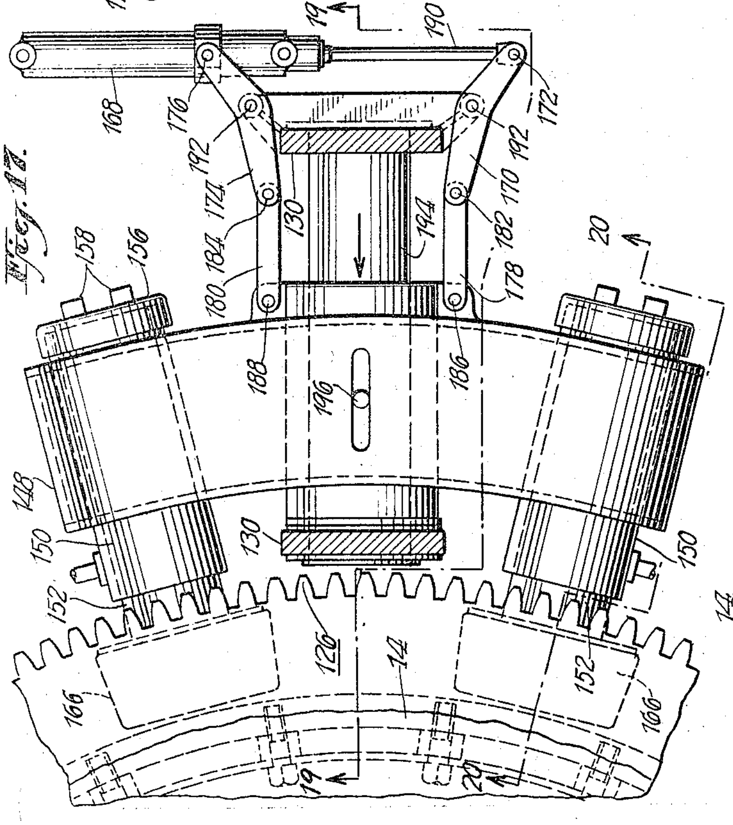
FIG. 17 is an enlarged plan view of a hook roller assembly in its extended position.

As seen in FIGS. 17 and 18, the hook roller assembly 128 comprises a roller housing 148 which carries sleeves 150 through which pass roller pins 152 secured by means of set screws 154 (FIG. 20). A cap 156 and a cap screw 158 are provided for the roller housing as seen in FIG. 20. Mounted on the inner end of the roller pin 152 is a spherical roller bearing 160 retained thereon by means of bearing lock nut 162 and retainer cap 164, the spherical roller bearing 160 carries a roller 166 which rides in the roller track of the roller track and gear 126.

Figure 19:
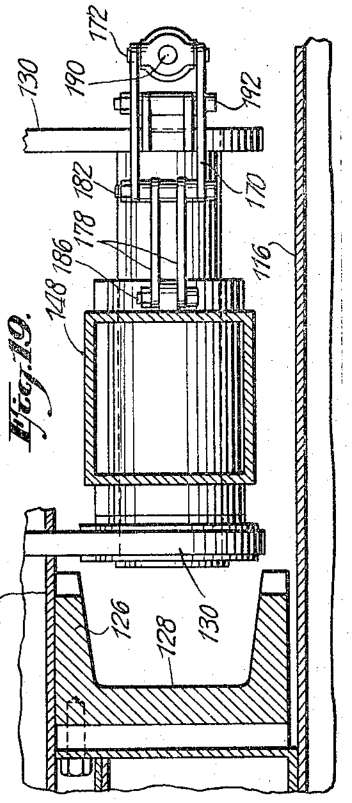
FIG. 19 is a sectional view taken substantially along the line 19—19 of FIG. 17.

Referring back to FIG. 13, it is seen that the table 14 is supported by four hook roller assemblies 128 each of which assembly contains two rollers 166. The rollers 166 are adapted to engage the roller track and gear 126 as shown in FIG. 17 during normal operation of the pile driver. The rollers 166 are adapted to be retracted from the roller track and gear 126 as shown in FIG. 18 when the pile driver is being prepared for shipment. The projecting and retracting of the rollers 166 is accomplished by means of a fluid or hydraulic cylinder 168 (FIGS. 17 and 18) having one end pivotally attached to a roller housing arm 170 as by means of pin 172 and the other end of the hydraulic cylinder 168 being connected to the roller housing arm 174 as by means of pin 176. The other ends of the roller housing arms 170 and 174 are pivotally connected to the roller housing links 178 and 180 (FIG. 17) as at 182 and 184, respectively. The links 178 and 180 are in turn pivotally connected to the roller housing 148 as at 186 and 188, respectively. The medial portion of the roller housing arms 170 and 174 are pivotally connected to the roller housing pin bracket 190 as at 192 (FIGS. 17, 18 and 19). Member 190 is fixedly connected to a roller housing pin 194 which pin carries tie plates 130 of the turntable 14 (FIGS. 17 and 19). Thus, it can be seen that by extending the hydraulic cylinder 168 the arms and linkage project the roller housing 148 so that the rollers 166 are positioned within the roller track and gear 126 (FIG. 17). When the hydraulic cylinder 168 is retracted (FIG. 18) the arms and linkage retract the roller housings 148 and the rollers 166 are removed from the roller track and gear 126. A grease fitting 196 is provided for purposes of assisting the movement of the roller housing 148 on the roller housing pin 194.

Figure 21:
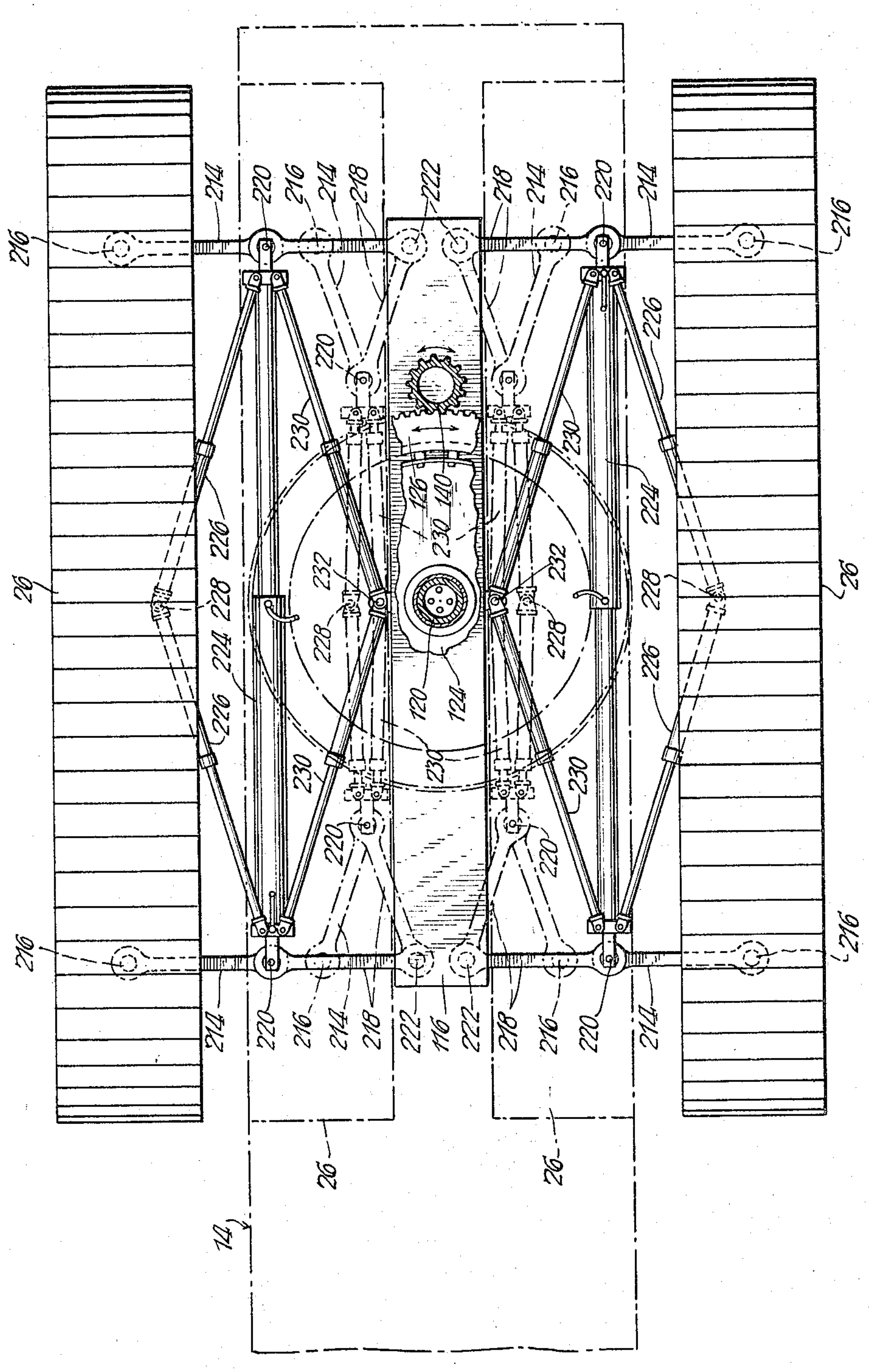
FIG. 21 is an enlarged plan view of the pile driver with the turntable and portions of the bedsill removed therefrom in order to reveal the crawlers and their associated retracting and extending mechanism.

As mentioned hereinbefore the pile driver is provided with a pair of crawlers 26. In order for the unit to be made as compact as possible for purposes of transporting it from one job site to another, the crawlers 26 are adapted to be moved inwardly during transit and moved outwardly when operating the device. Referring to FIG. 21, the crawlers 26 are shown by the solid lines when they are in their outer position and by the dotted lines when they are in their inner or retracted position. The crawlers 26 comprise frame members 198 (FIG. 13) which support sprocket-like gears 200 by means of axles 202, which gears drive the continuous roller belt or treads 204. Each crawler is individually driven by a hydraulic motor 206, fed by means of a hydraulic cable 208, through mechanical means including an endless chain 210, a gear reducer 211, and a gear 212 mounted on axle 202.

Turning again to FIG. 21, outboard bedsill links 214 are shown pivotally attached to the frame as at 216 and pivotally attached to inboard bedsill links 218 as at 220. The inboard bedsill links 218 are also pivotally connected to the bedsill 116 as at 222. Fluid or hydraulic cylinders 224 disposed substantially parallel to the crawlers 26 interconnect pivot points 220, respectively. Two pairs of tension links 226 are provided for each crawler. One end of each link is pivotally connected at point 220 and the other end thereof is pivotally connected to the crawler as at 228 (FIG. 21). There are provided two additional pairs of tension links 230. One end of each link is pivotally connected at point 220 and the other end thereof is pivotally connected to the bedsill 116 as at 232. In operation, after the crawlers have been lifted out of contact with the ground, selective actuation of the cylinders 224 controls the movement of the crawlers 26. When the cylinders 224 are extended by means of fluid or hydraulic pressure, the links assume the positions shown by the solid lines in FIG. 21 wherein the crawlers are in their outer or extended positions. When the cylinders 224 are retracted by means of hydraulic pressure, the links assume the position as shown by the dotted lines in FIG. 21 wherein the crawlers are in their inboard or retracted position such as is desirable for transit.

Referring back to FIG. 13, the horizontal base 12 comprises a drum platform 16 which is fixedly connected to the turntable 14 and contains a plurality of drums for the winding thereon of various cables. Hydraulic motors 234 drive drums 236, 238 and 240 through associated gear boxes 242. Drums 236 and 240 are adapted for the winding thereon of free lines 243 (FIG. 1) which pass around sheaves 244 mounted on cross pin 44 and thence up to the head frame 30 from whence it may be used, as desired. Drum 238 (FIG. 13) is adapted to carry a hammer line 246 (FIG. 1) which is adapted to pass around sheave 248 mounted on cross pin 44, thence to pass upwardly to sheave 250 mounted on one end of the head frame 30, thence to pass around sheave 252 at the other end of head frame 30, next to pass around sheave 254 mounted on one end of the hammer unit 32, and then to pass back up around sheave 252 and back to the hammer unit 32. In operation this line is employed for purposes of controlling the elevation of the hammer unit 32.

Referring to FIG. 13, channel members 256 are longitudinally disposed towards the outer side edges of the horizontal base 12. Mating channels 258 are adapted to telescope within channels 256 for purposes of extending or retracting the rear portions of the pile driver. Motive means for such movement is by a fluid or hydraulic cylinder 260 which has one end thereof anchored to the drum platform 16 and the other end thereof is joined to tie plate 262 medially of the fuel tank 22. When the pile driver is in operation and it is desired to have additional stability, the hydraulic cylinder 260 is extended thereby moving the engine 20, the fuel tank 22, the power pack 24, as well as the channels 258 outwardly by sliding the latter along channels 256. Conversely, when cylinder 260 is retracted, engine 20, fuel tank 22 and power pack 24 move inwardly as channels 258 are telescoped within channels 256, respectively.

As best seen in FIG. 14, the structural members constituting the fuel tank 22 support the power unit platform 18 in such a manner that the platform may be elevated or lowered, as desired. This operation is particularly advantageous when the pile driver is being prepared for transporting. The engine 20 and the power pack 24 are mounted upon the power unit platform 18. A tube 266 (FIG. 16) passes through the central portion of the gas tank 22 and functions like a hydraulic cylinder so that a piston-like member 268 (FIG. 14), fixedly connected to the power unit platform 18 as at 270, is motivated upwardly or downwardly by fluid pressure in a manner known in the art. The platform is guided by means of four reciprocatable posts 272 as best seen in FIG. 13, two posts being disposed towards the forward portion of the power pack and two posts being disposed in the outer portions of the fuel tank 22 as shown in FIG. 16. As seen in FIG. 14, the platform 18 indicated by the solid lines is in its upper position and the dotted lines indicate it in its lower position.

Referring to FIG. 13, it is noted that the pile driver is provided with three hydraulic leveling jacks 276, 278 and 280. As best seen in FIG. 14, hydraulic leveling jack 276 comprises a shaft 281 which extends upwardly through the center of the tube 266 and member 268 to a jack 284 mounted on the top of the fuel tank 22. Selective actuation of the jack 284 controls the elevation of the hydraulic leveling jack 276. At the other end of shaft 281 there is a foot member 286 which may be retracted within a recess 288 in the power unit platform 18 as indicated by the solid lines in FIG. 14. The foot 286, as illustrated by the dotted lines in FIG. 14, is in its extended position wherein it partially supports the pile driver.

Figure 22:
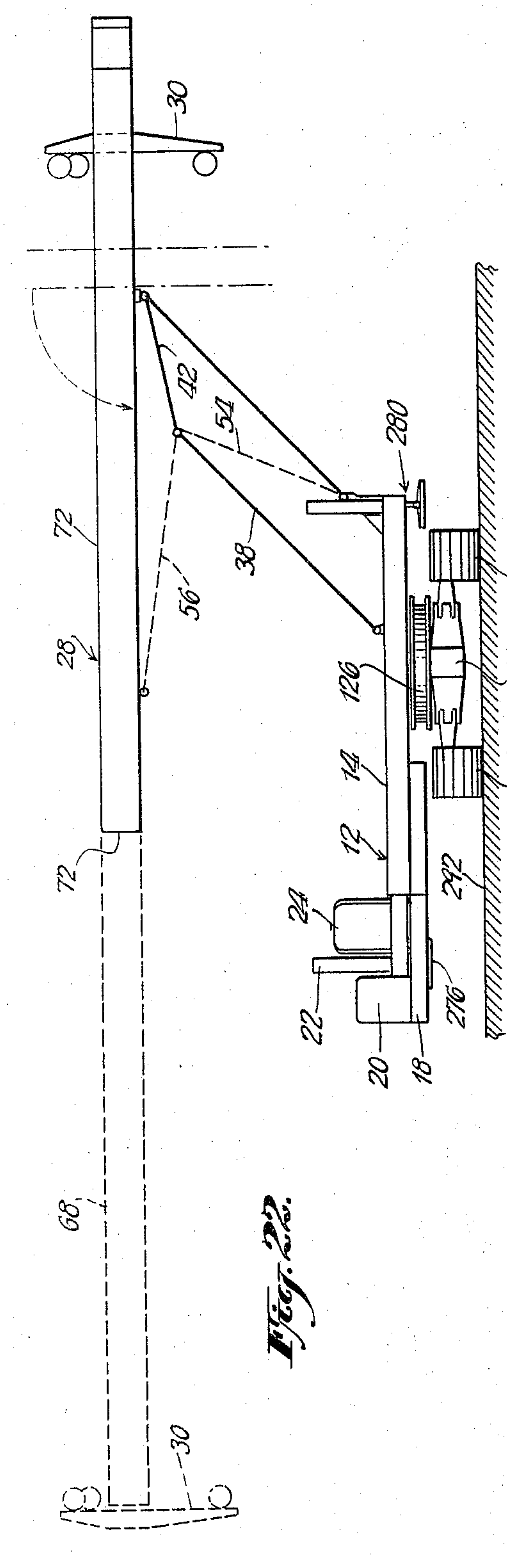
FIG. 22 is a schematic side elevation of the pile driver partially folded for transit.

The pile driver may be folded to present a compact unit for purposes of shipping or transporting from one location to another such as between job sites, for example. There are at least two different ways in which the illustrated pile driver may be shipped, the first being to ship the entire pile driver as one unit on a single motor vehicle or truck and the second being to ship the pile driver as two separate units on two separate trucks. The following initial compacting or shipping procedure is applicable to both ways of shipping and includes removing the hammer 32 and swinging the turntable 14 perpendicular to the crawlers 26 (FIGS. 22 and 23), thence retracting the spotting cylinder 54 (FIG. 22) until the leader 28 is at its maximum radius, removing all of the bolts 76 (FIG. 7) except one and retracting the batter cylinders 56 and 58 until the leader 28 is in a horizontal position, then removing the last bolt 76 (FIG. 7) and pivoting the upper leader section 68 from the position shown in the dotted lines of FIGS. 22 and 23 to a position shown in the solid lines of FIG. 23.

Figures 24, 25:
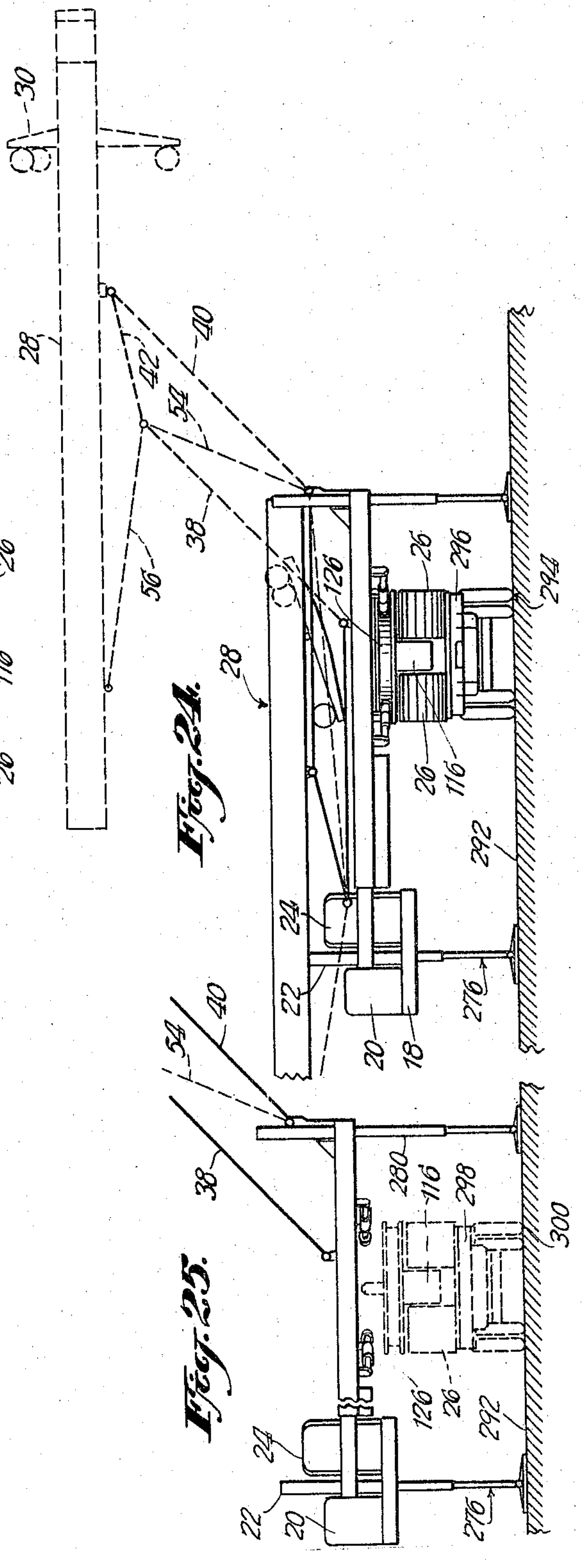
FIG. 24 is a schematic side elevation of the pile driver of FIG. 22 with the hydraulic leveling jacks extended for purposes of supporting the unit while a motor vehicle is driven thereunder.
FIG. 25 is a schematic side elevation showing the pile driver unit being separated into two components for transporting purposes.

When shipping one unit on one truck, after the above initial steps have been completed, the preparation for shipping comprises lowering the power unit platform 18 (FIG. 24) and extending the hydraulic jacks 276, 278 and 280 until the crawlers 26 clear the ground 292. The crawlers are then retracted as explained hereinbefore in connection with the description of FIG. 21. The next steps comprise again extending the jacks 276, 278 and 280 until the crawlers 26 clear the deck 296 of the truck 294. The truck is then driven underneath the crawlers 26 and the jacks 276, 278 and 280 are retracted until the crawlers 26 rest upon the truck deck 296 as shown in FIG. 24. The jacks are then retracted to their innermost positions.

Figures 25, 26, 27, 28:
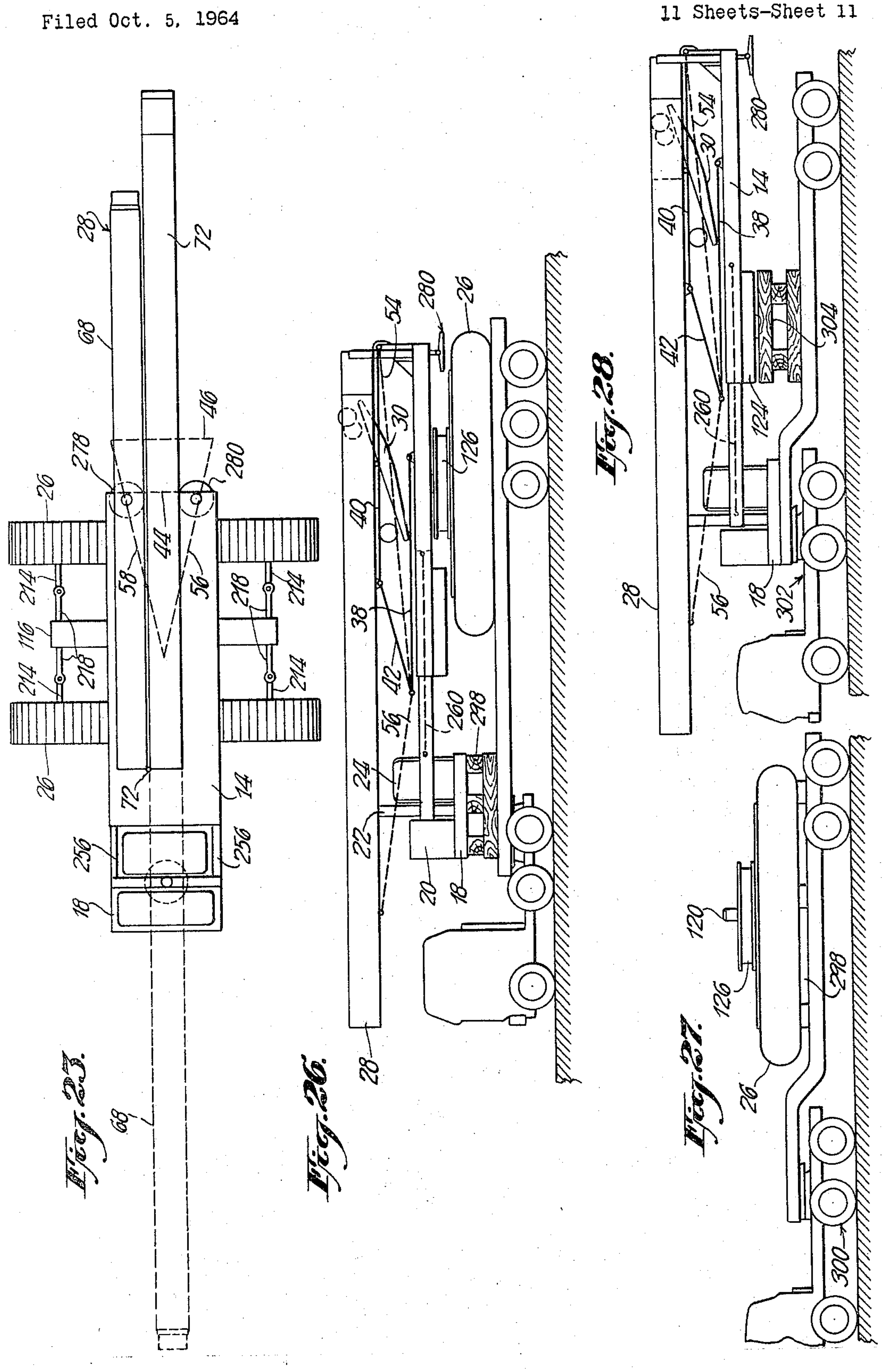
FIG. 26 is a schematic side elevation showing the pile driver of the one unit embodiment ready for transporting on a motor vehicle.
FIG. 27 is a schematic side elevation showing the lower portion of a pile driver ready for transporting on a motor vehicle.
FIG. 28 is a schematic side elevation showing the upper portions of the pile driver loaded ready for transporting on a motor vehicle.

The upper portion of the pile driver is then swung around parallel to the crawlers 26 as seen in FIG. 26. Subsequently, the engine 20, fuel tank 22, power pack 24 as well as the power unit platform 18 are moved forward by extending the cylinder 260. Still referring to FIG. 26, the spotting cylinder 54 is extended to lower the leader 28, the head frame 30 is rotated under the leader 28 as seen in FIG. 26, and the spotting cylinder 54 is lowered downwardly as far as possible. Subsequently, the power platform 18 is blocked up with blocking material 298 and the entire unit is tied down (not shown) and is ready to be driven away.

The second shipping procedure comprises dividing the pile driver into two separate units for loading on two separate trucks in order to reduce the weight carried by each truck to about ½ of the weight of one unit which weight may be of the order of about 20 to 25 tons for each truck. The second shipping procedure includes the aforementioned initial shipping procedure and further comprises extending the spotting cylinder 54 to lower the leader 28, rotating the head frame 30 under the leader 28, extending the hydraulic jacks 276, 278 and 280 to lift the pile driver until the crawlers 26 clear the ground 292 as illustrated in FIG. 25 by the dotted lines. This procedure further comprises retracting the crawlers 26, extending the hydraulic jacks until the crawlers 26 clear the deck 299 of the truck 300, driving the truck 300 under the crawlers 26 and retracting the jacks 276, 278 and 280 until the crawlers 26 rest on the deck, wherein the lower or crawler portion of the pile driver is tied down (not shown) to the truck deck 299.

The subsequent steps of the second procedure comprise retracting the hook roller assemblies 128 to disengage the rollers 166 from the roller track and gear 126 as shown in FIG. 18, disconnecting the power cables 122, FIG. 14, again extending the hydraulic jacks 276, 278 and 280 to raise the turntable and components depending therefrom until the turntable 14 clears the kingpin 114. The lower portion of the pile driver as shown in FIG. 27 may then be carried away by the truck 300. A second truck 302 (FIG. 28) having blocks 304 thereon is driven under the upper portion of the pile driver and the hydraulic jacks 276, 278 and 280 are retracted until the upper unit of the pile driver rests upon the blocks 304. The next step comprises rotating the turntable 14 substantially 90 degrees as by means of block and tackle (not shown), extending the hydraulic cylinder 260 to move the power unit platform 18 outwardly as shown in FIG. 28, thence extending the spotting cylinder 54 until the leader 28 is completely down and finally tying down (not shown) the upper portion of the pile driver and the truck 302 is ready to be driven away to the next location or job site.

Although particular embodiments of the invention are herein disclosed for purposes of explanation, various modifications thereof, after study of this specification, will be apparent to those skilled in the art to which the invention pertains, reference should accordingly be had to the appended claims in determining the scope of the invention.

What is claimed and desired to be secured by Letters Patent is:

1. A derrick comprising a horizontal base, a leader, a parallel motion mechanism pivotally interconnecting said base and said leader, said leader being medially foldable for shipping purposes, a bottom pile guide pivotally attached to said leader, a pivotable head frame for said leader, said horizontal base being supported by a pair of extensible crawlers, said horizontal base being adapted to support driving means, a portion of said horizontal base being extensible, and means for elevating said extensible portion of said horizontal base.

2. A derrick comprising a horizontal base, a leader, a parallel motion mechanism interconnecting said base and said leader for movement one with respect to the other, a fluid cylinder interconnecting two opposite points of said mechanism for purposes of radially positioning said leader with respect to said horizontal base, at least one fluid cylinder interconnecting one of said opposite points and said leader for pivoting said leader between a substantially vertical position and a substantially horizontal position, said horizontal base being supported by a pair of crawlers, said horizontal base being adapted to support driving means, a portion of said horizontal base being extensible, and means for elevating said extensible portion of said horizontal base.

3. A derrick comprising a horizontal base, a leader, a parallel motion mechanism pivotally interconnecting said base and said leader, a fluid cylinder diagonally interconnecting two opposing corners along the minor diagonal of said parallel motion mechanism to control the radial positioning of said leader, a fluid cylinder interconnecting the leader with one of said corners remote from said horizontal base, said last mentioned fluid cylinder being adaptable to pivot said leader between a vertical and a horizontal position, said leader being medially foldable for shipping purposes, pile guide means carried by said leader, means supporting said horizontal base, motive means carried by said horizontal base, a portion of said horizontal base being extensible, and means for elevating said extensible portion of said horizontal base.

4. In a derrick having a horizontal base, a boom member, means for guiding and supporting said boom member comprising a parallel motion mechanism pivotally interconnecting said base and said boom member, means for controlling the length of the diameters interconnecting opposite corners of said mechanism one diameter with respect to the other, means for pivoting said boom member between a vertical and a horizontal position, means for supporting said horizontal base, motive means carried by said horizontal base, a portion of said horizontal base being extensible, and means for elevating said extensible portion of said horizontal base.

5. In a derrick having a leader, means for guiding and supporting said leader comprising a turntable, a back frame, a top frame, a front frame, said back frame being pivotally connected to said top frame along a first pivot line, said top frame pivotally connected to the front frame along a second pivot line, said front frame pivotally connected to said table along a third pivot line, said back frame pivotally connected to said table along a fourth pivot line, a spotting cylinder interconnecting said first pivot line with said third pivot line, a medial portion of said leader being pivotally connected along said second pivot line, a pair of batter cylinders having the lower ends thereof pivotally connected along said first pivot line and having the other ends thereof pivotally connected to the upper section of said leader, said batter cylinders being selectively actuated for purposes of controlling the plumb of said leader, said batter cylinders being retractable until said leader is essentially horizontal when the spotting cylinder is in its extended position, said leader being medially foldable for shipping purposes, said horizontal base being supported by a pair of extensible crawlers, said horizontal base being adapted to support driving means, a portion of said horizontal base being extensible, means for elevating said extensible portion of said horizontal base.

6. In a derrick having a leader, means for guiding and supporting said leader comprising a turntable, a parallel motion mechanism pivotally interconnecting said turntable and said leader, means for selectively controlling the diametrical distance between opposite corners of said parallel motion mechanism one with respect to the other of said mechanism, means interconnecting said mechanism and said leader for positioning said leader between a vertical position and a horizontal position, a bedsill, means releasably interconnecting said turntable and said bedsill, said turntable being adapted to support driving means, a portion of said turntable being extensible, and means for elevating said extensible portion of said turntable.

7. In a derrick having a leader, means for guiding and supporting said leader comprising a turntable, a parallel motion mechanism pivotally interconnecting said turntable and said leader, means for selectively controlling the diametrical distance between opposite corners of said parallel motion mechanism one with respect to the other of said mechanism, means interconnecting said mechanism and said leader for positioning said leader between a vertical position and a horizontal position, a bedsill, means releasably interconnecting said turntable and said bedsill including roller means supported by said turntable, a roller track carried by said bedsill and adapted to receive said roller means, and motive means for said roller track.

8. In a derrick having a leader, means for guiding and supporting said leader comprising a turntable, a back frame, a top frame, a front frame, said back frame pivotally connected to said top frame along a first pivot line, said top frame pivotally connected to the front frame along a second pivot line, said front frame pivotally connected to said table along a third pivot line, said back frame pivotally connected to said table along a fourth pivot line, said leader being pivotally connected along said second pivot line, a hydraulic cylinder interconnecting said first pivot line and said third pivot line for radially positioning said leader, a pair of hydraulic cylinders having the lower ends thereof pivotally connected along said first pivot line in spaced relation one with respect to the other and having the upper ends thereof pivotally connected to said leader, whereby selective actuation of said pair of cylinders controls the alignment of said leader and positions said leader between a vertical position and a horizontal position.

9. In a derrick having a horizontal base, a leader, means for supporting and guiding said leader comprising a parallel motion mechanism member pivotally interconnecting said base and said leader, a pair of hydraulic cylinders having the lower ends pivotally connected to said parallelogram, said ends being spaced one with respect to the other, the other ends of said hydraulic cylinders being pivotally connected to said leader at substantially the same point one with respect to the other, whereby selective actuation of said pair of cylinders controls the alignment of said leader, and said hydraulic cylinders being retractable to the extent that said leader is movable from a vertical position to a horizontal position.

10. In a derrick having a leader, a pile guide comprising a support member, means mounting said support member on said leader for pivotal movement, a reciprocatable member mounted on said support member and adapted for reciprocating motion with respect thereto, a pair of arms pivotally mounted on said sleeve, a pair of jaws pivotally carried by said arms respectively and adapted to removably engage a pile, means for moving said reciprocatable member from a first extended position in which the jaws may engage a pile, to a second position in which the jaws move to their open position, and to a third position in which said support member is pivoted to a position remote from said pile.

11. In a derrick having a leader, a pile guide comprising a shaft, means mounting said shaft on said leader for pivotal movement, a guide member carried by said shaft and adapted to engage a pile, a reciprocatable member mounted on said shaft and adapted for longitudinal reciprocating motion with respect thereto, a pair of arms pivotally mounted on said reciprocatable member, a pair of jaws pivotally carried by said guide member and also pivotally connected to said arms respectively, said jaws being adapted to removably engage a pile, a fluid actuated cylinder pivotally attached to said reciprocatable member for moving same from a first extended position in which the jaws may engage a pile to a second position in which the jaws move to their open position and to a third position in which the shaft is pivoted to a position remote from said pile.

12. In a derrick having a leader, a pile guide comprising a shaft, a cross rod mounted on said leader, said shaft being mounted on said cross rod for pivotal movement with respect to said leader, a guide member fixedly connected to said shaft and adapted to engage a pile, a sleeve mounted on said shaft adapted for longitudinal reciprocating motion with respect thereto, spring means interposed between said guide member and said sleeve, a pair of arms pivotally mounted on said sleeve, a pair of jaws pivotally carried by said guide member and also pivotally connected to said arms respectively, said jaws being adapted to removably engage a pile, a fluid cylinder pivotally interconnecting said leader and said sleeve for moving said sleeve from a first extended position in which the jaws may engage a pile, to a second position in which the jaws move to their open position, to a third position in which the shaft is pivoted about said cross rod to a position substantially parallel to said leader.

13. A derrick comprising a horizontal base, a leader, means for interconnecting said base and said leader, a pair of parallelly disposed crawlers for supporting said horizontal base, a substantially parallelogram linkage for connecting one crawler to said base comprising a first corner pivotally attached to said crawler, a second oppositely disposed corner pivotally attached to said base, a pair of links pivotally connecting the third point of said parallelogram linkage to the crawler and to the base respectively, a second pair of links pivotally interconnecting the fourth point of said parallelogram linkage to the crawler and to the base respectively, and means for controlling the distance between the third and fourth points of said parallelogram linkage whereby said crawler may be moved transversely with respect to said base.

14. A derrick comprising a horizontal base, a leader, means for interconnecting said base and said leader, a pair of parallelly disposed crawlers for supporting said horizontal base, a substantially parallelogram linkage for connecting one crawler to said base comprising a first corner pivotally attached to said crawler, a second oppositely disposed corner pivotally attached to said base, a pair of links pivotally connecting the third point of said parallelogram linkage to the crawler and to the base respectively, a second pair of links pivotally interconnecting the fourth point of said parallelogram linkage to the crawler and to the base respectively, a fluid cylinder interconnecting said third and said fourth points of said parallelogram linkage to control the distance between said points and thereby to transversely motivate said crawler with respect to said base.

15. A derrick comprising a horizontal base, a pivotable leader, means mounting said leader on said base, said base being adaptable for rotary motion, a portion of said horizontal base being extensible, a pair of spaced telescopic-like channels for mounting said portion of said base, fluid cylinder means for controlling the extension of said portion of said base, means for elevating said portion of said horizontal base, said last named means comprising a plurality of guide posts for guiding the vertical movement of said portion and fluid jacking means for controlling the degree of elevation.

16. A derrick comprising a turntable, a pivotable leader, means mounting said leader on said turntable, a bedsill, a rotary member mounted on said bedsill, means mounting said rotary member for rotation thereof, a roller assembly carried by said turntable and adapted to engage said rotary member for imparting rotary motion to said turntable, and means for retracting said roller assembly from engagement with said rotary member for compacting said pile driver.

17. A derrick comprising a turntable, a leader, means mounting said leader for pivotable motion with respect to said turntable, a bedsill, a hub mounted on said bedsill, means for selectively imparting rotary motion to said hub, a roller track and gear mounted on the periphery of said hub, a hook roller assembly carried by said turntable, said hook roller assembly comprising a roller housing, a roller, means mounting said roller in said roller housing, said roller being adapted to be received in said roller track, a support member for said roller housing, linkage means for mounting said roller housing on said support member, and means for selectively moving said linkage means to move said roller housing and thereby to retract said roller from said roller track.

18. A derrick comprising a turntable, a leader, means mounting said leader for pivotable motion with respect to said turntable, a bedsill, a hub mounted on said bedsill, means for selectively imparting rotary motion to said hub, a roller track and gear mounted on the periphery of said hub, a hook roller assembly carried by said turntable, said hook roller assembly comprising a roller housing, a pair of rollers, means mounting said rollers in said roller housing, said rollers being adapted to be received in said roller track, a support member for said roller housing, interposed between said pair of rollers, linkage means for mounting said roller housing on said support member, a fluid cylinder, a second linkage means interconnecting said fluid cylinder and said roller housing whereby selective actuation of said fluid cylinder moves said roller housing with respect to said support member and thereby retracts said rollers from said roller track for compacting said derrick.

19. A derrick comprising a horizontal base, a leader, a parallel motion mechanism pivotally interconnecting said base and said leader, said leader being medially foldable for shipping purposes, a head frame, the medial portion of which being pivotally connected to said leader for rotating said head frame under said leader for shipping purposes, and driving means for said horizontal base.

20. A derrick comprising a horizontal base, a leader, means pivotally interconnecting said base and said leader, said leader being medially foldable for shipping purposes, a head frame being medially pivotally connected to said leader for rotating said head frame under said leader for shipping purposes, first sheave means mounted towards one end of said head frame and second sheave means mounted towards the other end thereof, a work tool, and cable means adapted to pass from said horizontal base to said first sheave means, to said second sheave means, and to said work tool for supporting and controlling said work tool.

References Cited by the Examiner

UNITED STATES PATENTS

| | | | |
|---|---|---|---|
| 3,021,168 | 2/1962 | Bodine | 294—88 |
| 3,035,646 | 5/1962 | Johansson | 173—43 |
| 3,141,511 | 7/1964 | O'Leary | 173—43 |
| 3,144,135 | 10/1964 | Brown | 173—28 |
| 3,181,630 | 5/1965 | Coburn | 173—44 |
| 3,205,961 | 9/1965 | Nolte | 180—9.48 |

FOREIGN PATENTS

| | | |
|---|---|---|
| 628,266 | 1949 | Great Britain. |

FRED C. MATTERN, Jr., *Primary Examiner.*

L. P. KESSLER, *Assistant Examiner.*